United States Patent [19]
Namigawara

[11] Patent Number: 5,132,534
[45] Date of Patent: Jul. 21, 1992

[54] OPTICAL PICKUP WITH POSITION ADJUSTING MEANS

[75] Inventor: Noboru Namigawara, Tokorozawa, Japan

[73] Assignee: Pioneer Electronic Corporation, Tokyo, Japan

[21] Appl. No.: 631,312

[22] Filed: Dec. 21, 1990

[30] Foreign Application Priority Data

Dec. 28, 1989 [JP] Japan .................................. 1-339450

[51] Int. Cl.$^5$ .............................................. H01J 5/02
[52] U.S. Cl. .................................. 250/239; 369/44.15
[58] Field of Search ...................... 250/202, 216, 239; 369/44.15, 44.16

[56] References Cited

U.S. PATENT DOCUMENTS

4,978,844  12/1990  Ujihara .................................. 250/239

Primary Examiner—David C. Nelms
Attorney, Agent, or Firm—Sughrue, Mion, Zinn Macpeak & Seas

[57] ABSTRACT

An information reading device is used as an optical pickup in a compact disk player or the like for playing back an optical disk. The optical pickup has an adjusting fulcrum about which a base supported on a base mount can be turned with respect to the base mount, a first adjusting screw for angularly adjusting the position of the base with respect to the base mount in a tangential direction of the disk, and a second adjusting screw for angularly adjusting the position of the base with respect to the base mount in a radial direction of the disk. The adjusting fulcrum and the first and second adjusting screws are positioned in a particular positional relationship to prevent any crosstalk from being produced when the base is adjusted in the tangential or radial direction after the base has been adjusted in the radial or tangential direction. When the first and second adjusting screws are turned, the position of the base with respect to the base mount is adjusted about the principal point on the base mount side of an objective lens supported on the base. Therefore, incident and exit angles of the objective lens are equalized to each other through the adjustments.

4 Claims, 9 Drawing Sheets

OPTICAL PICKUP WITH POSITION ADJUSTING MEANS

BACKGROUND OF THE INVENTION

The present invention relates to an information reading device or optical pickup for optically reading recorded information from an information storage medium such as a compact disk (CD), a laser vision disk (LVD), or the like, and more particularly to a skew adjusting mechanism for use in such an optical pickup.

Recorded information stored in optical information storage mediums such as CDs, LBDs, or the like is reproduced by CD players, LVD players, or the like. The CD players and the LVD players have an optical pickup for optically reading recorded information from a disk. The optical pickup has a laser diode for emitting a laser beam to read recorded information. The laser beam generated by the laser diode is focused into a beam spot on the information recording surface of the disk by an objective lens. The laser beam thus applied as a beam spot to the information recording surface of the disk is reflected thereby as a light beam bearing information represented by pits on the disk. The reflected light beam goes through the objective lens to a photodetector, which converts the light beam into an electric RF signal for the reproduction of the recorded information.

The optical pickup is required to apply the laser beam as a sufficiently small beam spot to the information recording surface of the disk. To meet this requirement, the optical pickup has to be mounted in the player in a proper position or a attitude so that the optical axis of the optical pickup extends perpendicularly to the information recording surface of the disk and the laser beam will not be defocused on the disk due to aberrations of the objective lens. When the player is assembled, therefore, the position or inclination of the optical pickup or objective lens is adjusted through a process known as skew adjustment in order to minimize the aberrations of the objective lens and any deviation of the optical axis of the optical pickup. Such skew adjustment is made by a skew adjusting mechanism on a base of the optical pickup.

One conventional skew adjusting mechanism has three adjusting screws which supports an objective lens supporting device on the base of the optical pickup. The operator adjusts the height of the points where the objective lens supporting device is supported by the adjusting screws by turning the adjusting screws, thereby setting the objective lens for a desired focal length and inclination.

The prior skew adjusting mechanism however requires a complex, tedious, and time-consuming adjusting procedure since fine adjustments have to be repeated using the three adjusting screws until proper objective lens position and inclination are achieved.

SUMMARY OF THE INVENTION

It is an object of the present invention to provide an optical pickup having a skew adjusting mechanism for allowing easy skew adjustments and improving image height characteristics.

According to the present invention, there is provided an optical pickup for reading information recorded along tracks on an information storage medium, comprising an optical element for reading the recorded information as an optical signal, a base supporting the optical element, a base mount supporting the base, an adjusting fulcrum supported on the base and serving as a fulcrum about which the base can be turned when the position of the base with respect to the base mount is adjusted, the adjusting fulcrum being positioned on either side of a tangential line extending parallel to a line tangential to one of the tracks of the information storage medium and passing through an optical center of the optical element, the adjusting fulcrum being disposed near a center line extending radially of the tracks and passing through the optical center of the optical element, and a plurality of adjusting screws supported on the base for angularly adjusting the position of the base with respect to the base mount, the adjusting screws including a first adjusting screw which is disposed near the center line for angularly adjusting the position of the base with respect to the base mount about a principal point on the base mount side of the optical element primarily in a radial direction of the tracks, and a second adjusting screw which is disposed near the tangential line remotely from the optical center for angularly adjusting the position of the base with respect to the base mount about the principal point only in a tangential direction of the tracks, after the base has been adjusted by the first adjusting screw.

According to the present invention, there is also provided an optical pickup for reading information recorded along tracks on an information storage medium, comprising an optical element for reading the recorded information as an optical signal, a base supporting the optical element, a base mount supporting the base, an adjusting fulcrum supported on the base and serving as a fulcrum about which the base can be turned when the position of the base with respect to the base mount is adjusted, the adjusting fulcrum being positioned on either side of a center line extending radially of the tracks and passing through an optical center of the optical element, the adjusting fulcrum being disposed near a tangential line extending parallel to a line tangential to one of the tracks of the information storage medium and passing through the optical center of the optical element, and a plurality of adjusting screws supported on the base for angularly adjusting the position of the base with respect to the base mount, the adjusting screws including a first adjusting screw which is disposed near the tangential line for angularly adjusting the position of the base with respect to the base mount about a principal point on the base mount side of the optical element primarily in a tangential direction of the tracks, and a second adjusting screw which is disposed near the center line remotely from the optical center for angularly adjusting the position of the base with respect to the base mount about the principal point only in a radial direction of the tracks, after the base has been adjusted by the first adjusting screw.

With the above arrangements, the adjusting fulcrum about which the base can be turned, the first adjusting screw for adjusting the base in the tangential direction, and the second adjusting screw for adjusting the base in the radial direction, are held in a certain positional relationship. First, the first adjusting screw is turned, and then the second adjusting screw is turned to angularly adjust the position of the base with respect to the base mount about the principal point on the base mount side of the optical element. In this manner, any crosstalk is prevented from being produced when the base is adjusted in the tangential or radial direction after the base has been adjusted in the radial or tangential direction. Skew adjustments can be effected simply in a short period of time, and image height characteristics are improved.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Before describing embodiments of the present invention, a general optical pickup will first be described with reference to FIGS. 1, 2A and 2B for a better understanding of the present invention.

Figure 1:
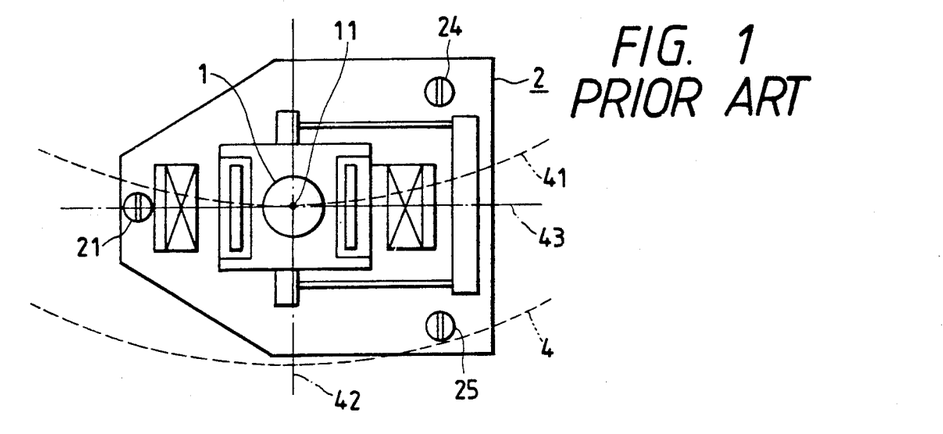
FIG. 1 is a plan view of a general optical pickup.
Figure 2A:
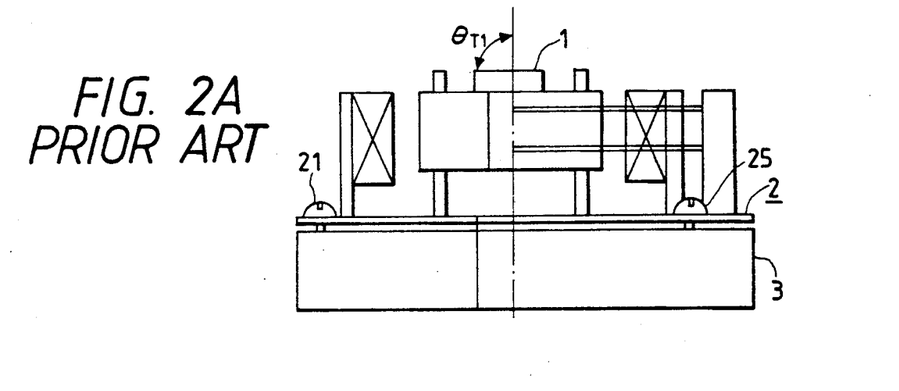
FIGS. 2A and 2B are front and side elevational views of the optical pickup shown in FIG. 1.
Figure 2B:
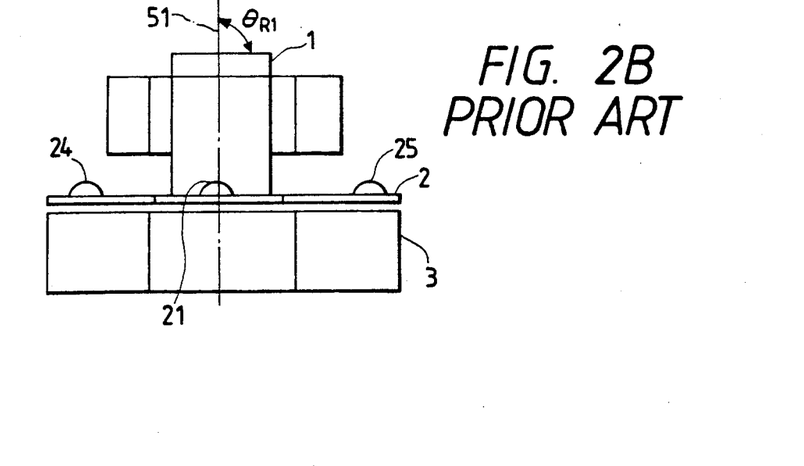

As shown in FIG. 1, an information reading device or optical pickup is positioned in confronting relation to a disk 4 as an information storage medium which stores recorded information as spiral pits along tracks 41. The optical pickup comprises an objective lens 1 for applying a light beam emitted from a light source (not shown) as a focused beam spot to the disk 4, a base 2 supporting the objective lens 1 and capable of adjusting the skew of the objective lens 1, and a base mount 3 on which the base 2 is supported.

The base 2 has an adjusting fulcrum 21 and two adjusting screws 24, 25. The adjusting fulcrum 21 is positioned at one end of the base 2 on a lefthand side (as shown in FIG. 1) of a central line 42 which extends radially of the disk 4 and passes through the optical center 11 of the objective lens 1. The adjusting fulcrum 21 is also disposed on a tangential line 43 extending through the optical center 11 of the objective lens 1 tangentially to a track of the disk 4. When the base 2 is adjusted in its position with respect to the base mount 3, the base 2 is turned about the adjusting fulcrum 21. The adjusting screws 24, 25 are positioned at the other end of the base 2 on a righthand side (as shown in FIG. 1) of the center line 42 and symmetrical with respect to the tangential line 43. The adjusting screws 24, 25 serve to adjust the position of the base 2 in a radial direction, indicated by the screw R, of the disk 4 and in a tangential direction, indicated by the arrow T, of the disk 4.

Skew adjustment of the optical pickup shown in FIG. 1 will be described below with reference to FIGS. 2A and 2B.

The adjusting screws 24, 25 are turned to adjust the distance of the base 2 from the base mount 3. Such an adjustment is effected alternately in the radial direction R and the tangential direction T until the angle $\theta_{R1}$ of the objective lens 1 with respect to an optical axis 51 of the optical pickup in the radial direction R becomes 90° and the angle $\theta_{T1}$ of the objective lens 1 with respect to the optical axis 51 in the tangential direction T becomes also 90°.

In the above skew adjusting procedure, after the angle $\theta_{T1}$ in the tangential direction T has been adjusted to 90° through a tangential skew adjusting step, the angle $\theta_{R1}$ in the radial direction R is adjusted to 90° through a radial skew adjusting step. Since a crosstalk is produced at each adjusting step, the tangential and radial skew adjusting steps have to be repeated. Therefore, many skew adjusting steps and a long period of time are required before both the angles $\theta_{T1}$, $\theta_{R1}$ in the tangential and radial directions T, R become 90°.

It would be possible to move the base 2 angularly on the base mount 3 for skew adjustments. However, if the center about which the base 2 is angularly moved is located at the focal point of the objective lens 1 or the vertex of the spherical or aspherical surface of the objective lens 1, then image height characteristics would not be appreciably improved when adjusted.

An optical pickup according to a preferred embodiment of the present invention will now be described below with reference to FIGS. 3, 4, 5A, and 5B.

Figure 3:
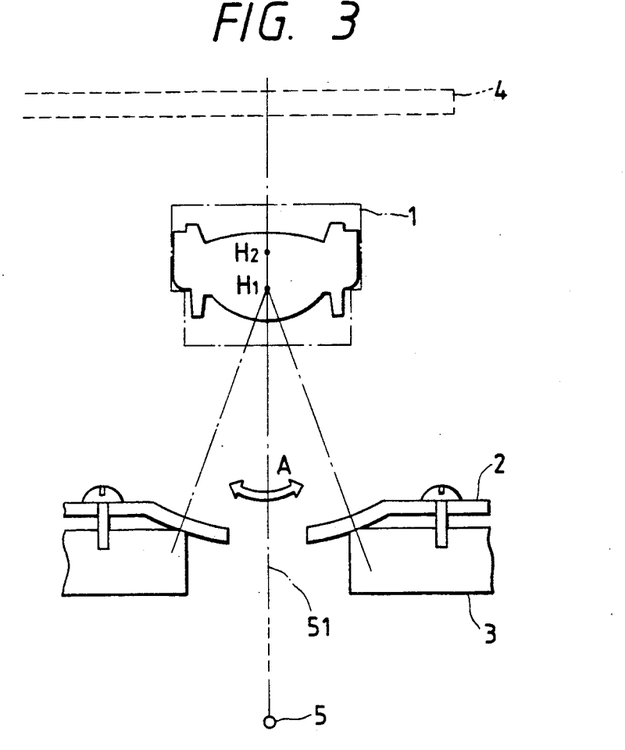
FIG. 3 is a fragmentary cross-sectional view of an optical pickup according to an embodiment of the present invention.
Figure 4:
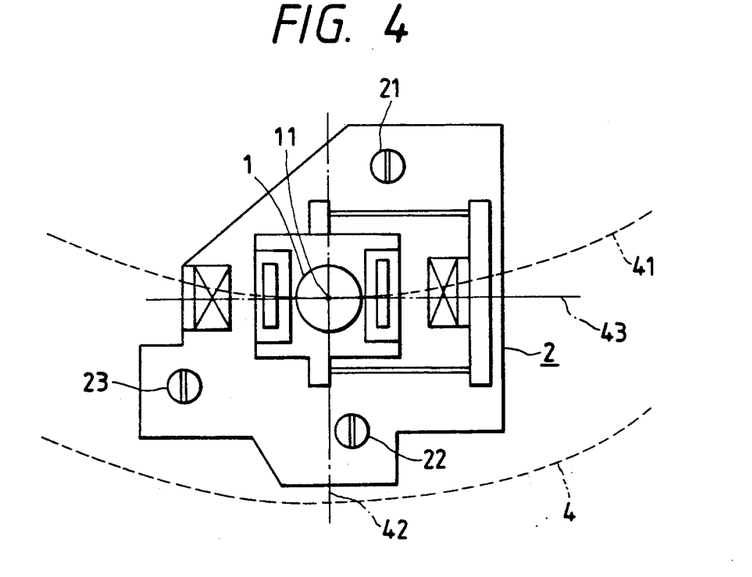
FIG. 4 is a plan view of the optical pickup shown in FIG. 3.

The optical pickup according to the present invention comprises an objective lens 1, a base 2, and a base mount 3 which are disposed between a disk 4 and a light source (not shown), the optical pickup having an optical axis 51. The base 2 is supported at a skew supporting portion.

The base 2 has an adjusting fulcrum 21 and first and second adjusting screws 22, 23 for skew adjustments. The adjusting fulcrum 21 is positioned on an upper side (as shown in FIG. 4) of a tangential line 43 which extends through the optical center 11 of the objective lens 1 parallel to a tangential direction of a track 41 of the disk 4. The adjusting fulcrum 21 is disposed near a center line 42 extending radially of the disk 4 through the optical center 11 of the objective lens 1. The adjusting fulcrum 21 is used to adjust the position of the base 2 with respect to the base mount 3. The first adjusting screw 22 is positioned on a lower side (as shown in FIG. 4) of the tangential line 43 remotely from the adjusting fulcrum 21 and near the center line 42. The first adjusting screw 22 serves to angularly adjust the position of the base 2 with respect to the base mount 3 about a principal point $H_1$ on the base mount side of the objective lens 1 in a direction A (see FIG. 3) with respect to the radial direction of the track 41. The second adjusting screw 23 is disposed new the tangential line 43 remotely from the optical center 11 of the objective lens 1. The second adjusting screw 23 serves to angularly adjust the position of the base 2 with respect to the base mount 3 about the principal point $H_1$ on the base mount side of the objective lens 1 in a direction A (see FIG. 3) with respect to the tangential direction of the track 41, after an adjustment is made by the first adjusting screw 22.

The adjusting fulcrum 21 and the first and second adjusting screws 22, 23 are located in respective positions which are predetermined by experiments and simulation processes. Typical experimental positional examples and a process of determining the positions of the adjusting fulcrum 21 and the first and second adjusting screws 22, 23 will now be described with reference to FIGS. 6A through 6E and 7A through 7E. In FIGS. 7A through 7E, a circular mark (○) indicates skew angles in case that the first adjusting screw 22 is rotated while a square mark (□) indicates skew angles in case that the second adjusting screw 23 is rotated.

Figure 6A:
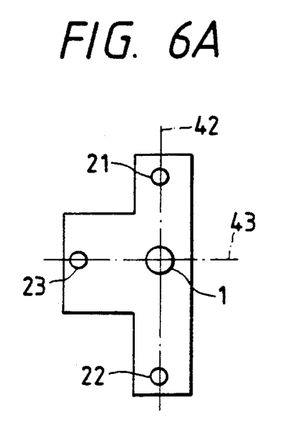
FIGS. 6A through 6E are views showing experimental examples for determining the positions of an adjusting fulcrum and adjusting screws.
Figure 7A:
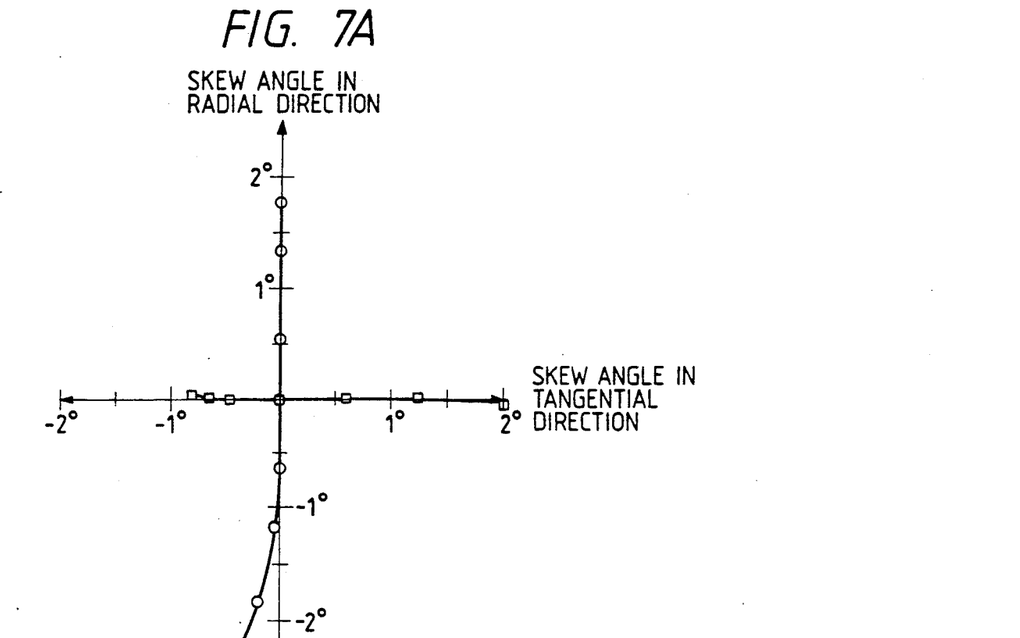
FIGS. 7A through 7E are diagrams showing adjustments in a coordinate system of tangential and radial skew angles, the views corresponding to FIGS. 6A through 6E, respectively.

FIG. 6A shows an example in which the adjusting fulcrum 21 and the first adjusting screw 22 are located on the center line 42 and the second adjusting screw 23 is disposed on the tangential line 43. FIG. 7A shows adjustments achieved for skew angles in the tangential and radial directions T, R with the example shown in FIG. 6A. It can be seen from FIG. 7A that when the first and second adjusting screws 22, 23 are turned, the skew angles on the coordinate axes in the tangential and radial directions T, R can successively be adjusted, with no crosstalk produced. Since, however, the adjusting fulcrum 21 and the adjusting screws 22, 23 are on the center line 42 and the tangential line 43, their positions are fixed and impose some limitations on the designing and manufacturing processes.

Figure 6B:
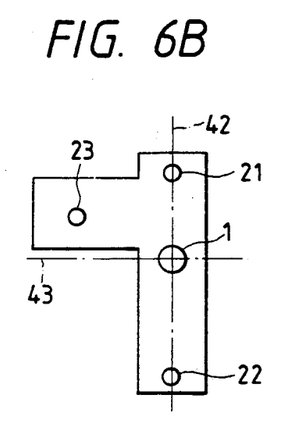
Figure 7B:
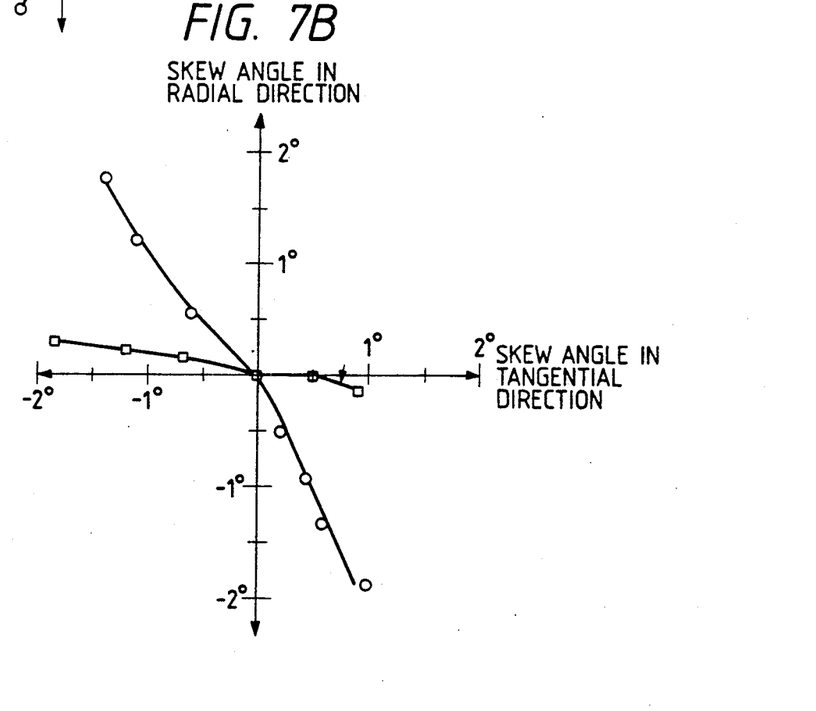

FIG. 6B shows an example in which the adjusting fulcrum 21 and the first adjusting screw 22 are located on the center line 42 and the second adjusting screw 23 is disposed slightly off the tangential line 43. FIG. 7B shows adjustments achieved for skew angles in the tangential and radial directions T, R with the example shown in FIG. 6B. It can be seen from FIG. 7B that when the first adjusting screw 22 is turned, a large crosstalk is produced, and when the second adjusting screw 23 is turned, a crosstalk is somewhat produced. It will be understood that when the second adjusting screw 23 is displaced from the tangential line 43, a large crosstalk is produced with respect to the skew angle in the radial direction R.

Figure 6C:
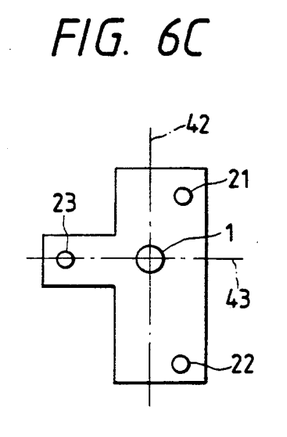
Figure 7C:
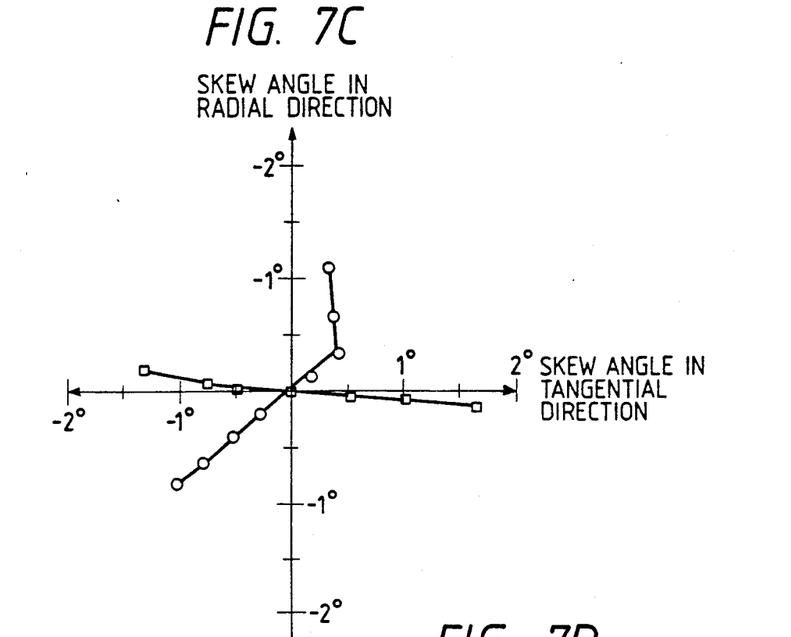

FIG. 6C shows an example in which the adjusting fulcrum 21 and the first adjusting screw 22 are displaced from the center line 42 parallel thereto and the second adjusting screw 23 is disposed on the tangential line 43. FIG. 7C shows adjustments achieved for skew angles in the tangential and radial directions T, R with the example shown in FIG. 6C. It can be seen from FIG. 7C that when the adjusting fulcrum 21 and the first adjusting screw 22 are displaced from the center line 42 parallel thereto, a large crosstalk is produced with respect to the skew angle in the radial direction R, and only a slight crosstalk is produced with respect to the skew angle in the tangential direction T.

Figure 6D:
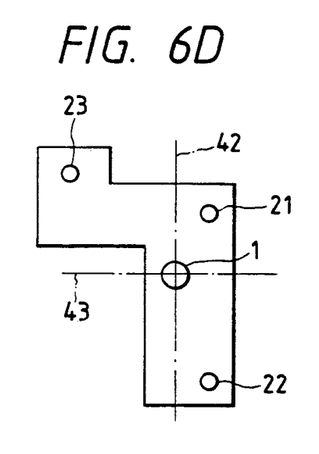
Figure 7D:
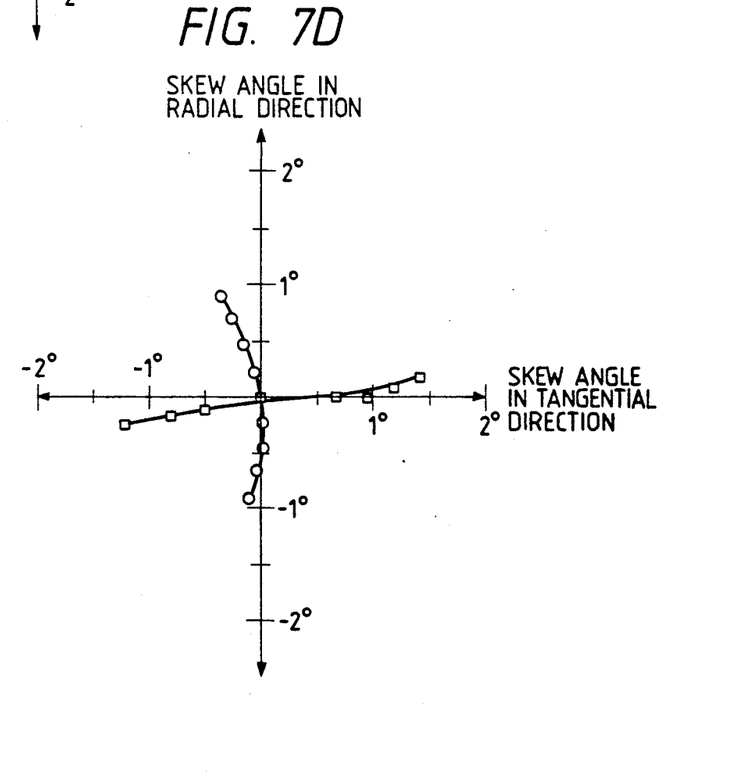

FIG. 6D shows an example which is similar to the example of FIG. 6C except that the second adjusting screw 23 is displaced largely from the tangential line 43. FIG. 7D shows adjustments achieved for skew angles in the tangential and radial directions T, R with the example shown in FIG. 6D. It can be seen from FIG. 7D that even when the second adjusting screw 23 is displaced from the position shown in FIG. 6C, the magnitude of the crosstalk with respect to the tangential direction T remains substantially unchanged.

Figure 6E:
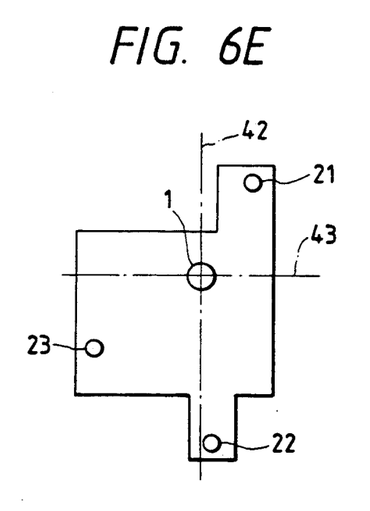
Figure 7E:
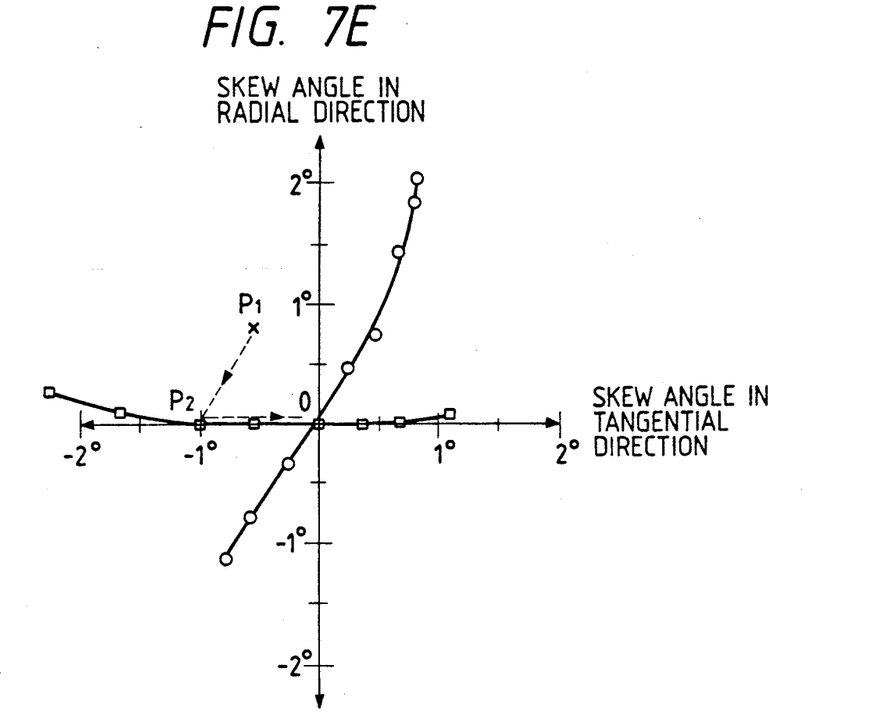
Figure 8:
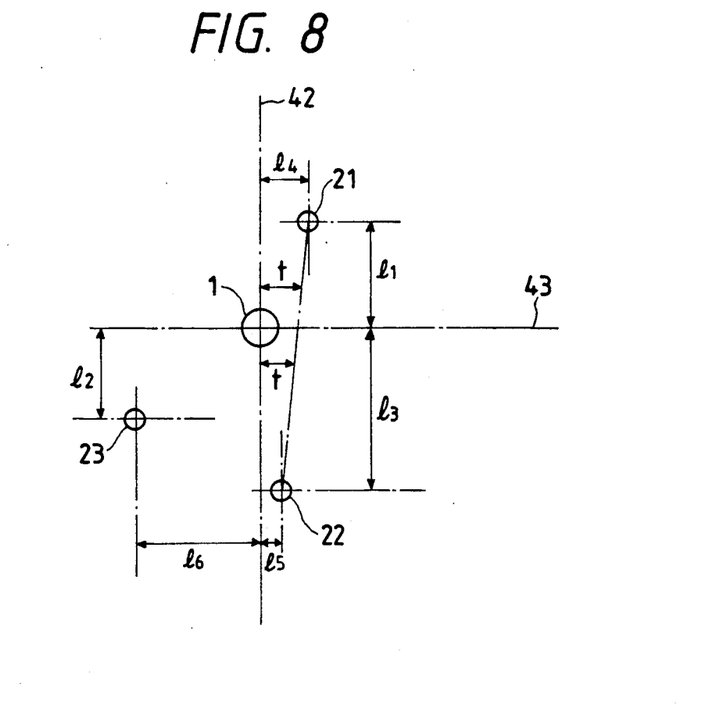
FIG. 8 is a diagram showing an arrangement of an adjusting fulcrum and adjusting screws.

FIG. 6E shows an example in which a line interconnecting the adjusting fulcrum 21 and the first adjusting screw 22 is inclined with respect to the center line 42, with the second adjusting screw 23 displaced largely from the tangential line 43. FIG. 7E shows adjustments achieved for skew angles in the tangential and radial directions T, R with the example shown in FIG. 6E. It can be seen from FIG. 7E that even when the line interconnecting the adjusting fulcrum 21 and the first adjusting screw 22 is not parallel to the center line 42, no crosstalk is produced with respect to the skew angle in the tangential direction T. However, it is preferable that the line interconnecting the adjusting fulcrum 21 and the first adjusting screw 22 be inclined by a small angle with respect to the center line 42. If the line interconnecting the adjusting fulcrum 21 and the first adjusting screw 22 is inclined by a large angle with respect to the center line 42, then it is necessary to increase the distance between the adjusting fulcrum 21 and the first adjusting screw 22. From the experimental examples shown in FIGS. 5A through 6E can be derived the following conditions for the positioning of the adjusting fulcrum 21 and the first and second adjusting screws 22, 23 (see FIG. 8):

(1) The line interconnecting the adjusting fulcrum 21 and the first adjusting screw 22 should be as parallel as possible to the center line 42, and the distance t between the above line and the center line 42 should be as small as possible.

(2) If the above requirement (1) is not met, then the distance $l_4$ between the adjusting fulcrum 21 and the center line 42 should be as small as possible. At this time, the adjusting fulcrum 21 and the first adjusting screw 22 are disposed one on each side of the tangential line 43, and should preferably be spaced from the tangential line 43 by large distances $l_1$, $l_2$.

(3) The second adjusting screw 23 should be located on one side of the center line 42 where the adjusting fulcrum 21 and the first adjusting screw 22 are not positioned. The distance $l_2$ between the second adjusting screw 23 and the tangential line 43 should be small, and the distance $l_6$ between the second adjusting screw 23 and the center line 42 should be large.

An adjusting procedure for the example shown in FIG. 6E will be described below with reference to FIG. 7E.

It is assumed that skew angles are at a coordinate point $P_1$ before adjustments are made. First, the first adjusting screw 22 is turned to vary the skew angles from the coordinate point $P_1$ to a coordinate point $P_2$ in a direction indicated by the broken line arrow until the skew angle in the radial direction R becomes 0° (at this time, the angle $\theta_R$ with respect to the optical axis 51 is 90°, see FIG. 5A). As the first adjusting screw 2 is thus turned, the skew angle in the tangential direction T also varies to $-1°$ at the coordinate point $P_2$. Then, the second adjusting screw 23 is turned to vary the skew angle in the tangential direction from the coordinate point $P_2$ to the coordinate origin O in a direction indicated by the broken line arrow until the skew angle in the tangential direction T becomes 0° (at this time, the angle $\theta_T$ with respect to the optical axis 51 is 90°, see FIG. 5B). When the second adjusting screw 23 is turned, no crosstalk is produced in the radial direction R. Therefore, the skew angles of the objective lens 1 can be adjusted to zero in two adjusting steps.

A skew adjusting procedure with respect to the optical pickup shown in FIGS. 3, 4, 5A, and 5B will now be described below.

Figure 5A:
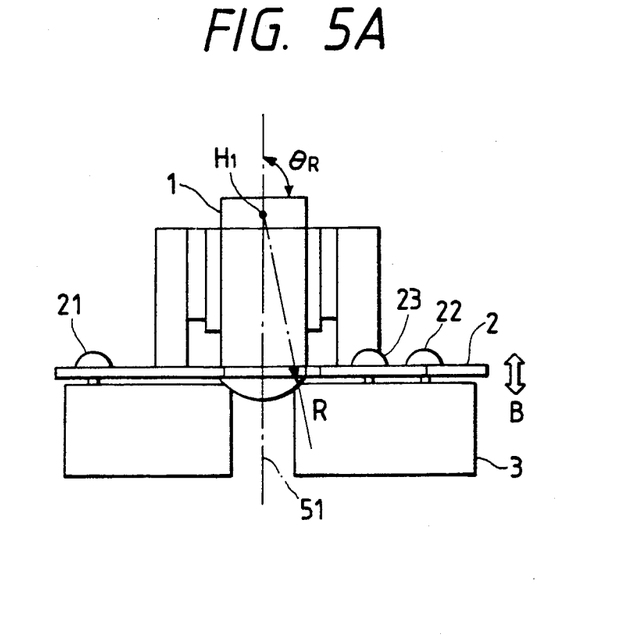
FIGS. 5A and 5B are side and front elevational views of the optical pickup shown in FIG. 4.
Figure 5B:
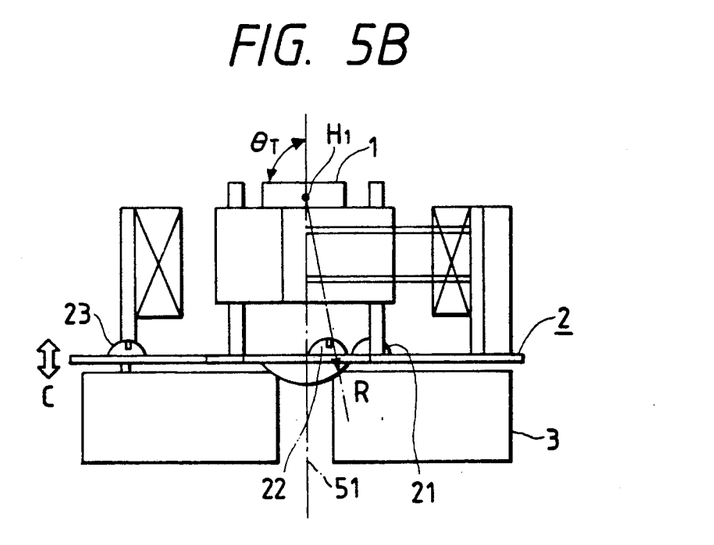

For adjustments in the radial direction R, the first adjusting screw 22 is turned to vertically move the base 2 with respect to the base mount 3 in the direction indicated by the arrow B in FIG. 5A. This vertical movement causes the base 2 to turn on the base mount 3 about the principal point $H_1$ on the base side of the objective lens 1 in the direction A (FIG. 3) along an arcuate path having a radius R (R=a). Upon such turning movement of the base 2 at the radius R, the position of the base 2 varies between the fixed disk 4 and the light source 5, skewing the objective lens 1 mounted on the base 2 through an angle $\Delta\theta_R$ with respect to the optical axis 51.

Adjustments in the tangential direction T are performed after the adjustments in the radial direction R are made. For adjustments in the tangential direction T, the second adjusting screw 23 is turned to vertically move the base 2 with respect to the base mount 3 in the direction indicated by the arrow C in FIG. 5B. This vertical movement causes the base 2 to turn on the base mount 3 about the principal point $H_1$ in the direction A (FIG. 3) along the arcuate path having the radius R. The objective lens 1 is now skewed through an angle $\Delta\theta_T$ with respect to the optical axis 51.

Since the adjusting fulcrum 21 and the first and second adjusting screws 22, 23 are located in the particular preferred positions determined from the experimental examples, the adjustments in the tangential direction T can be made without producing any crosstalk with respect to the adjustments in the radial direction R.

Figure 9A:
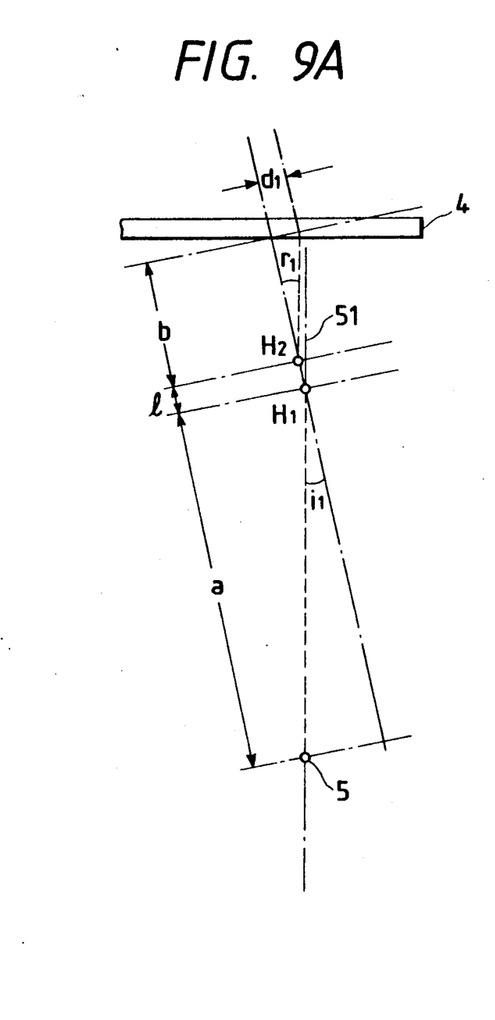
FIGS. 9A through 9C are diagrams showing the relationship between an objective lens and a disk, FIG. 9A illustrating skew-adjustments about a principal point on the base mount side, FIG. 9B skew adjustments about a principal point on the image side, and FIG. 9C skew adjustments about the image-side focal point of an objective lens.

The relationship between the above skew adjustments and image height characteristics will be described in comparison with conventional optical pickups with reference to FIGS. 9a through 9C. FIG. 9A shows skew adjustments about the principal point $H_1$ on the base mount side, FIG. 9B skew adjustments about a principal point $H_2$ on the image side, and FIG. 9C skew adjustments about an image-side focal point P of an objective lens 1.

When skew adjustments are made about the principal point $H_1$ on the base mount side of the objective lens 1 as shown in FIG. 9A, since the principal point $H_1$ on the base mount side and the principal point $H_2$ on the image side are in conjugate relationship to each other, an incident angle $i_1$ and an exit angle $r_1$ are equal to each other, and an image height $d_1$ is expressed as follows:

$$d_1 = b \cdot r_1 \quad (1)$$

where b is the distance to the image point.

Figure 9B:
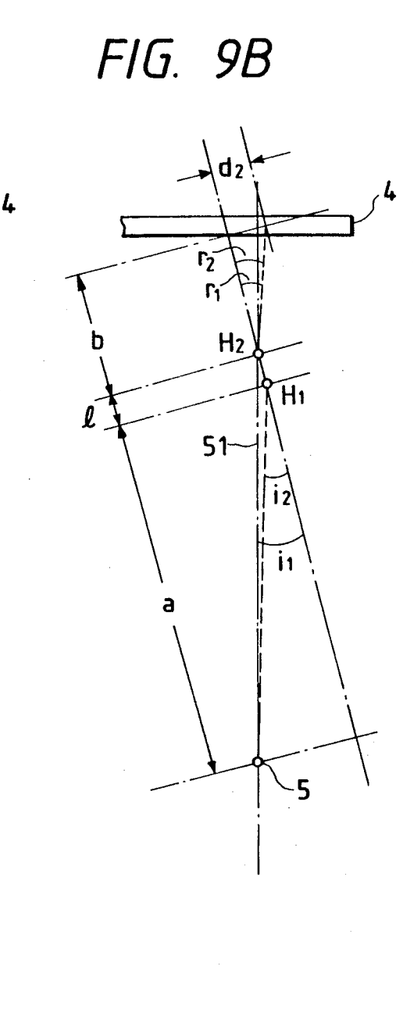

When skew adjustments are made about the principal point $H_2$ on the image side of the objective lens 1 as shown in FIG. 9B, an incident angle $i_2$ and an exit angle $r_2$ differ from each other, and an image height $d_2$ is given by:

$$d_2 = b \cdot r_2 \quad (2)$$

Figure 9C:
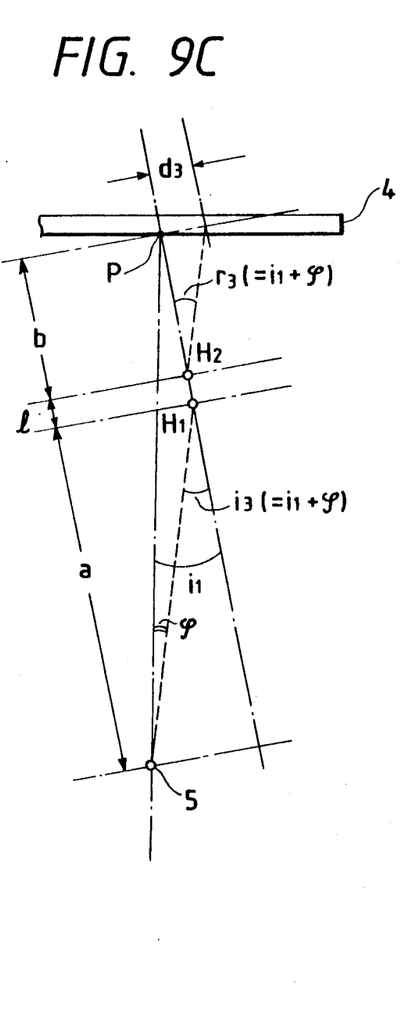

When skew adjustments are made about the focal point P of the objective lens 1 (focused point on the disk 4) as shown in FIG. 9C, an image height $d_3$ is expressed as follows:

$$d_3 = b \cdot r_3 = b \times (i_1 + \phi) \quad (3)$$

where $\phi$ is the angle of the principal ray from the light source 5 with respect to the line extending from the light source perpendicularly to the disk 4.

In FIG. 9C, from the relationship between images at the principal point $H_1$ on the base mount side is established the following equation:

$$(b+l) \cdot \sin i_1 \approx a \cdot \sin \phi$$

$$(b+l) \cdot i_1 \approx a \cdot \phi \quad (4)$$

Substituting the equation (4) for the equation (3), the following equation is obtained:

$$d_3 \approx b \times \left( i_1 + \frac{b+l}{a} i_1 \right)$$
$$= b \cdot i_1 \left( 1 + \frac{b+l}{a} \right). \quad (5)$$

Comparison between the image height $d_1$ according to the above embodiment and the image height $d_2$, $d_3$ in the other arrangements indicates that the image height $d_1$ is the smallest, and serves as the most suitable position as the center for the skew adjustments. More specifically, since the angle $r_2$ is larger than the angle $r_1$, the image height $d_1$ is smaller than the image height $d_2$. The image height $d_1$ smaller than the image height $d_3$ by $(b \cdot i_1(b+l)/a)$.

The image heights $d_1$, $d_2$, $d_3$ will be described below with reference to specific numerical values. It is assumed that the magnification of the objective lens 1 is about 5.5 times, the distance a to the object point (light source 5) is −4.56 [mm], the distance b to the image point (on the disk 4) is 25.09 [mm], and the thickness l of the objective lens 1 is 0.64 [mm]. If a light beam is applied from the light source 5 at an incident angle $i_1 = 0.5C$ (=0.00873 [rad]), then the image heights are $d_1 = 0.0398$ [mm], $d_2 = 0.0408$ [mm], and $d_3 = 0.0481$ [mm]. Therefore, the image height $d_1$ according to the embodiment of the present invention is smaller than the other image heights $d_2$, $d_3$.

Figure 10:
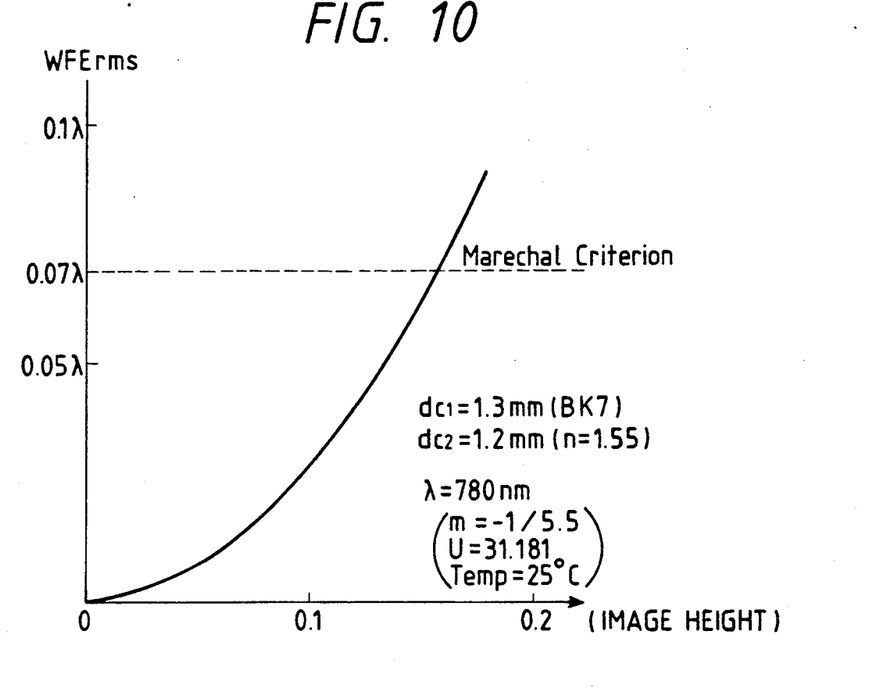
FIG. 10 is a diagram of image-height/wavefront aberrations.

The relationship between the image heights and wavefront aberrations is shown in the image height/wavefront aberration diagram of FIG. 10.

In the above embodiment, the adjusting fulcrum 21 is located on the side of the base 2 which is closer to the center of the disk 4 and the first and second adjusting screws 22, 23 are located on the side of the base 2 which is farther from the center of the disk 4. However, the adjusting fulcrum and the first and second adjusting screws may be positioned otherwise, i.e., on the opposite sides farther from and closer to, respectively, the center of the disk 4.

An optical pickup according to another embodiment of the present invention will be described below with reference to FIG. 11.

Figure 11:
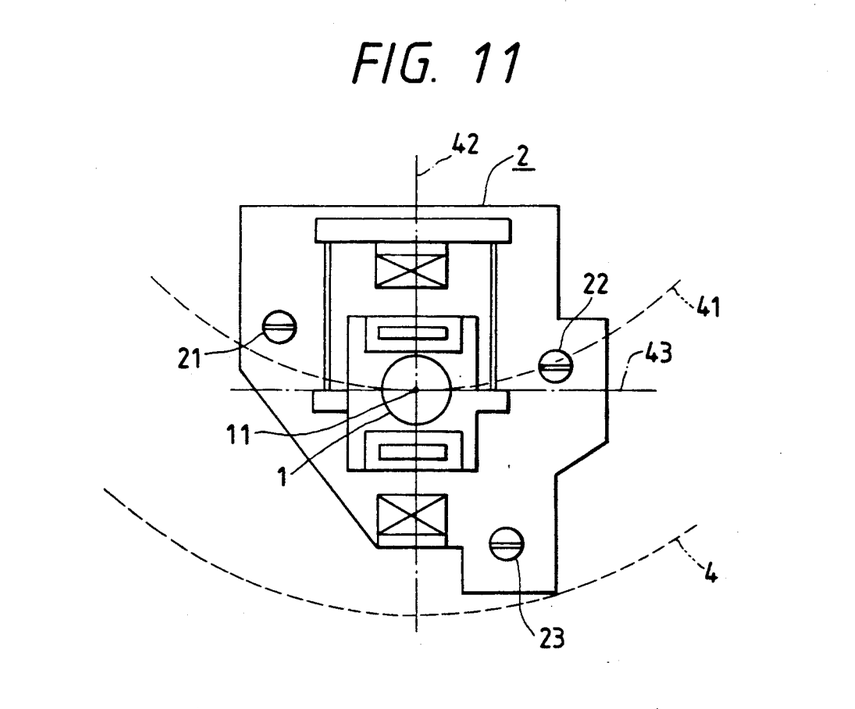
FIG. 11 is a plan view of an optical pickup according to another embodiment of the present invention.

The optical pickup shown in FIG. 11 has a base 2 which supports an adjusting fulcrum 21 and a first and a second adjusting screws 22, 23, just like the optical pickup according to the preceding embodiment, but differs therefrom as to its orientation with respect to the disk 4.

More specifically, the adjusting fulcrum 21 is disposed on the lefthand side of the center line 42 near the tangential line 43, and serves as a fulcrum about which the base 2 is turned when the position of the base 2 is adjusted. The first adjusting screw 22 is disposed on the righthand side of the center line 42 near the tangential line 43, and is used to adjust the skew angles primarily in the tangential direction T. The second adjusting angle 23 is disposed near the center line 42 remotely from the optical center 11, and is used to adjust the skew angles in the radial direction R after the adjustments have been made using the first adjusting screw 22.

The adjustments are made using the second adjusting screw 23 after the adjustments have been made using the first adjusting screw 22, as described above. Therefore, the skew angles can be adjusted without any crosstalk produced when the final adjustments are made using the second adjusting screw 23.

The invention may be embodies in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup for reading information recorded along tracks on an information storage medium, comprising:
    an optical element for reading the recorded information as an optical signal;
    a base supporting said optical element;
    a base mount supporting said base;
    an adjusting fulcrum supported on said base and serving as a fulcrum about which said base can be turned when the position of said base with respect to said base mount is adjusted, said adjusting fulcrum being positioned on either side of a tangential line extending parallel to a line tangential to one of the tracks of the information storage medium and passing through an optical center of said optical element, said adjusting fulcrum being disposed near a center line extending radially of the tracks and passing through the optical center of said optical element; and
    a plurality of adjusting screws supported on said base for angularly adjusting the position of said base with respect to said base mount, said adjusting screws including a first adjusting screw which is disposed near said center line for angularly adjusting the position of said base with respect to said base mount about a principal point on the base mount side of said optical element primarily in a radial direction of the tracks, and a second adjusting screw which is disposed near said tangential line remotely from said optical center for angularly adjusting the position of said base with respect to said base mount about said principal point only in a tangential direction of the tracks, after said base has been adjusted by said first adjusting screw.

2. An optical pickup according to claim 1, wherein said adjusting fulcrum is disposed on the opposite side of said first and second adjusting screws with respect to said tangential line, and said adjusting fulcrum and first adjusting screw are disposed on the opposite side of said second adjusting screw with respect to said center line.

3. An optical pickup for reading information recorded along tracks on an information storage medium, comprising:
    an optical element for reading the recorded information as an optical signal;
    a base supporting said optical element;
    a base mount supporting said base;
    an adjusting fulcrum supported on said base and serving as a fulcrum about which said base can be turned when the position of said base with respect to said base mount is adjusted, said adjusting fulcrum being positioned on either side of a center line extending radially of the tracks and passing through an optical center of said optical element, said adjusting fulcrum being disposed near a tangential line extending parallel to a line tangential to one of the tracks of the information storage medium and passing through the optical center of said optical element; and
    a plurality of adjusting screws supported on said base for angularly adjusting the position of said base with respect to said base mount, said adjusting screws including a first adjusting screw which is disposed near said tangential line for angularly adjusting the position of said base with respect to said base mount about a principal point on the base mount side of said optical element primarily in a tangential direction of the tracks, and a second adjusting screw which is disposed near said center line remotely from said optical center for angularly adjusting the position of said base with respect to said base mount about said principal point only in a radial direction of the tracks, after said base has been adjusted by said first adjusting screw.

4. An optical pickup according to claim 3, wherein said adjusting fulcrum is disposed on the opposite of said first and second adjusting screws with respect to said center line, and said adjusting fulcrum and first adjusting screw are disposed on the opposite side of said second adjusting screw with respect to said tangential line.

* * * * *